United States Patent
Walker et al.

(10) Patent No.: US 6,778,961 B2
(45) Date of Patent: Aug. 17, 2004

(54) METHOD AND SYSTEM FOR DELIVERING TEXT-TO-SPEECH IN A REAL TIME TELEPHONY ENVIRONMENT

(75) Inventors: David L. Walker, Tucson, AZ (US); Mark G. Mackelprang, Tucson, AZ (US); Andrew J. Sipe, Tucson, AZ (US); David V. Elsberry, Tucson, AZ (US)

(73) Assignee: WConect, LLC, Davenport, FL (US)

( * ) Notice: Subject to any disclaimer, the term of this patent is extended or adjusted under 35 U.S.C. 154(b) by 524 days.

(21) Appl. No.: 09/858,740

(22) Filed: May 16, 2001

(65) Prior Publication Data

US 2001/0047260 A1 Nov. 29, 2001

Related U.S. Application Data

(60) Provisional application No. 60/205,002, filed on May 17, 2000.

(51) Int. Cl.[7] .............................................. G01L 13/00
(52) U.S. Cl. ...................... 704/260; 704/201; 704/270; 370/412
(58) Field of Search ................................ 704/201, 235, 704/258, 260, 270; 379/1.02, 67.1, 77, 88.01, 88.04, 88.16, 88.17, 88.18, 88.22–88.26; 370/412

(56) References Cited

U.S. PATENT DOCUMENTS

| | | | | |
|---|---|---|---|---|
| 4,985,914 A | * | 1/1991 | Fukunaga | ................. 379/88.27 |
| 5,799,063 A | | 8/1998 | Krane | |
| 5,859,718 A | * | 1/1999 | Yamamoto et al. | ............ 398/51 |
| 5,884,262 A | * | 3/1999 | Wise et al. | ............... 704/270.1 |
| 6,442,547 B1 | * | 8/2002 | Bowman-Amuah | ........... 707/10 |
| 6,546,366 B1 | * | 4/2003 | Ronca et al. | ................ 704/260 |
| 6,625,656 B2 | * | 9/2003 | Goldhor et al. | ............. 709/231 |
| 6,643,291 B1 | * | 11/2003 | Yoshihara et al. | ........ 370/395.5 |
| 2001/0056348 A1 | * | 12/2001 | Hyde-Thomson et al. | ... 704/260 |
| 2003/0137938 A1 | * | 7/2003 | Belanger et al. | ............. 370/230 |

* cited by examiner

Primary Examiner—Doris H. To
Assistant Examiner—Tim Lao
(74) Attorney, Agent, or Firm—Brooks Kushman P.C.

(57) ABSTRACT

A method and system for communicating information to a telephony user in response to a request for the information from the telephony user includes a text data source having text documents and a voice application operable with the text data source for retrieving a text document related to the requested information. A text-to-speech (TTS) manager divides the text document into text document segments. TTS engines convert the text document segments into speech segments. Each text document segment is converted into a speech segment by one TTS engine. A buffer reassembles the speech segments in the proper order and then delivers the speech segments to the user. The TTS manager divides the text document as a function of the rate at which speech segments are delivered to the user such that the speech segments are delivered from the TTS engines to the buffer and from the buffer to the user continuously.

18 Claims, 1 Drawing Sheet

METHOD AND SYSTEM FOR DELIVERING TEXT-TO-SPEECH IN A REAL TIME TELEPHONY ENVIRONMENT

CROSS-REFERENCE TO RELATED APPLICATIONS

This application claims the benefit of U.S. Provisional Application No. 60/205,002 filed May 17, 2000.

TECHNICAL FIELD

The present invention is generally related to communication methods and systems employing text-to-speech engines and, more particularly, to a method and system for delivering text-to-speech in a real time telephony environment.

BACKGROUND ART

Text-to-speech (TTS) engines are computing devices which convert written text into audible computer generated speech. Telephony based applications require TTS engines to convert email, news, stock quotes, sports scores, and many other types of textual data into speech for delivery to telephony users. In these types of telephony applications, a speech version of a text document is demanded in real time by telephony users. Because the text which is requested by telephony users is not known beforehand, the text must be converted in real time and delivered without delay to the telephony users.

Performing high quality text-to-speech conversion or synthesis is resource intensive. For example, given 4,000 bytes of textual data, a typical TTS engine produces an audio or speech file having three million bytes to play for the telephony user. This is a 700 to one expansion ratio and presents a serious bottleneck for the synthesis of large textual documents. As a result, the telephony user will likely not wait for the several minutes it may take to convert the entire textual document into speech before the speech is provided to the telephony user. Synthesizing the text into speech before the telephony user requests the text is not a viable option as it is generally not known what the telephony user will request. Additionally, the physical storage requirements for a large number of pre-synthesized audio files is prohibitive in many environments.

DISCLOSURE OF INVENTION

Accordingly, it is an object of the present invention to provide a method and system for delivering text-to-speech (TTS) in a real time telephony environment in which text documents of any size are efficiently converted into speech which is provided immediately to a telephony user.

It is another object of the present invention to provide a method and system for delivering TTS in a real time telephony environment in which a first part of a text is converted into a first speech segment and the first speech segment is delivered to a telephony user while a second part of the text is being converted into second speech segment for delivery to the telephony user after the first speech segment has been delivered to the telephony user.

It is a further object of the present invention to provide a method and system for delivering TTS in a real time telephony environment in which a text is divided into text segments for conversion by a farm of TTS engines into speech segments which are then reassembled in the proper order and delivered to a telephony user.

It is still another object of the present invention to provide a method and system for delivering TTS in a real time telephony environment which employ a streaming buffer of speech converted from text for delivery to a telephony user in which the streaming buffer adapts to the bandwidth of the network delivering the speech to the telephony user.

It is still a further object of the present invention to provide a method and system for delivering TTS in a real time telephony environment which employ a streaming buffer for storing speech converted from text such that a first speech segment corresponding to a first text segment is delivered to the telephony user from the streaming buffer while a second speech segment corresponding to a second text segment is being delivered to the streaming buffer for future delivery to the telephony user.

In carrying out the above objects and other objects, the present invention provides a communication system for communicating information to a telephony user in response to a request for the information from the telephony user. The system includes a text data source having a plurality of text documents. A voice application is operable with the telephony user for receiving a request from the telephony user for information. The voice application is operable with the text data source for retrieving a text document related to the information requested by the telephony user. A text-to-speech (TTS) resource manager is operable for dividing the text document into text document segments and associating a sequence number with each text document segment. The TTS resource manager places the text document segments and the corresponding sequence numbers in a sequential order within a queue. A TTS engine farm has a plurality of TTS engines which are operable for receiving text document segments and the corresponding sequence numbers from the queue of the TTS resource manager in the sequential order for converting the text document segments into speech segments. Each text document segment is converted into a speech segment by one TTS engine. A buffer receives the speech segments and the corresponding sequence numbers from the TTS engines. The buffer uses the corresponding sequence numbers to reassemble the speech segments in the proper order and then delivers the speech segments in the proper order to the telephony user via the voice application in order to satisfy the request for information from the telephony user.

The TTS resource manager is operable to determine the rate at which speech segments are delivered to the telephony user from the buffer. The TTS resource manager divides the text document as a function of the rate at which speech segments are delivered to the telephony user such that the speech segments are delivered from the TTS engines to the buffer and from the buffer to the telephony user continuously.

The TTS resource manager is further operable to determine the load of each of the TTS engines. The TTS resource manager delivers the text document segments to the TTS engines as a function of the load of the TTS engines.

In operation, the buffer delivers a first speech segment to the telephony user via the voice application after the buffer has received a second speech segment from a TTS engine and while the buffer is receiving a third speech segment from a TTS engine such that the speech segments are delivered to the telephony user continuously. The buffer delivers the first speech segment to the telephony user via the voice application while a TTS engine is converting a fourth text document segment into a fourth speech segment.

The request from the telephony user may be an audio request. The voice application is operable for converting the audio request into a text request in order to retrieve a text document related to the information requested by the telephony user. Similarly, the request from the telephony user may be a dual tone multi-frequency request. The voice application is operable for converting the dual tone multi-frequency request into a text request in order to retrieve a text document related to the information requested by the telephony user.

Further, in carrying out the above objects and other objects, the present invention provides a communication method for communicating information from a text data source having a plurality of text documents to a telephony user in response to a request for the information from the telephony user. The method includes receiving a request from the telephony user for information. A text document related to the information requested by the telephony user is then retrieved. The text document is then divided into text document segments and a sequence number is associated with each text document segment. The text document segments and the corresponding sequence numbers are then placed in a sequential order within a queue. Respective text document segments and the corresponding sequence numbers are then transferred from the queue in the sequential order to respective TTS engines. Respective text document segments are then converted into speech segments using one TTS engine for each respective text document segment. The speech segments and the corresponding sequence numbers from the TTS engines are then stored in a buffer. The stored speech segments are then reassembled in the proper order in the buffer using the corresponding sequence numbers. The speech segments are then delivered in the proper order from the buffer to the telephony user in order to satisfy the request for information from the telephony user.

The method may further include determining the rate at which speech segments are delivered to the telephony user from the buffer. The text document is divided into text document segments as a function of the rate at which speech segments are delivered to the telephony user such that the speech segments are delivered from the buffer to the telephony user continuously.

The method may also include determining the load of each of the TTS engines, wherein transferring includes transferring the respective text document segments to the respective TTS engines as a function of the load of the TTS engines.

The advantages of the present invention are numerous. The present invention efficiently processes text documents of any size and begins playing the speech synthesis to the telephony user immediately. The present invention provides an immediate response to the telephony user and, in cases where the telephony user terminates the session by skipping to another text document request or by hanging up the telephone in the middle of a TTS conversion, the present invention intelligently terminates the conversion process of the TTS engines thus conserving otherwise wasted processing resources. This also provides an efficient means by which audio buffers are given to the telephony user at a rate to allow continuous playing of an audio stream while not overloading the voice application with unnecessary buffers which the voice application would need to manage and/or not use if the telephony user terminates the session.

The above objects and other objects, features, and advantages of the present invention are readily apparent from the following detailed description of the best mode for carrying out the present invention when taken in connection with the accompanying drawings.

BEST MODE FOR CARRYING OUT THE INVENTION

Figure 1:
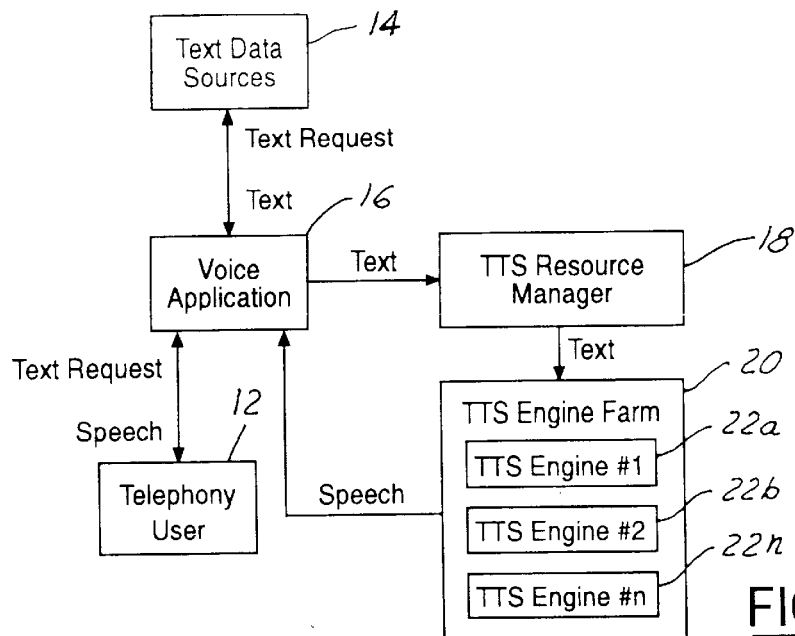
FIG. 1 illustrates a block diagram of a communication system in accordance with a preferred embodiment of the present invention.

Referring now to FIG. 1, a block diagram of a communication system in accordance with a preferred embodiment of the present invention is shown. Communication system 10 is a voice portal platform for enabling a telephony user 12 to access written text such as email, news, weather conditions, sport scores, stock quotes, and other information from text data sources 14. In response to a request for text or other information from telephony user 12, communication system 10 locates and converts the requested text into speech (audio) and then provides the speech to the telephony user via a voice application 16. Telephony user 12 may be a wired or wireless telephony user and text data sources 14 may include text data sources such as the Internet and text data source providers such as email providers, news providers, weather condition providers, sport scores providers, stock quote providers, and other text data storage networks.

Telephony user 12 transmits a request for information to voice application 16. The request for information from telephony user 12 to voice application 16 may be performed by the telephony user speaking an audible request or using digital signaling such as dual tone multi-frequency (DTMF) touch tone dialing. In response to an audible text request from telephony user 12, voice application 16 uses automatic speech recognition capability for understanding the audible text request. Similarly, voice application 16 is functional to understand a DTMF text request from telephony user 12. For example, telephony user 12 may transmit a request to voice application 16 for a weather report for a particular city. In response to this request, voice application 16 accesses text data sources 14 to find a text document having the weather report for the particular city. Voice application 16 then receives an electronic copy of the weather report text from a text data source 14. As will be described in greater detail below, a text-to-speech (TTS) resource manager 18 and a TTS engine farm 20 having a plurality of TTS engines 22 are operable to convert or synthesize the weather report text from voice application 16 into computer generated speech. TTS engine farm 20 provides the speech of the weather report text to voice application 16 which then forwards the speech to telephony user 12. Advantageously, TTS engines 22 can be added and removed from TTS engine farm 20 as demand increases and decreases without disrupting any of the other TTS engines in the TTS engine farm.

Figure 2:
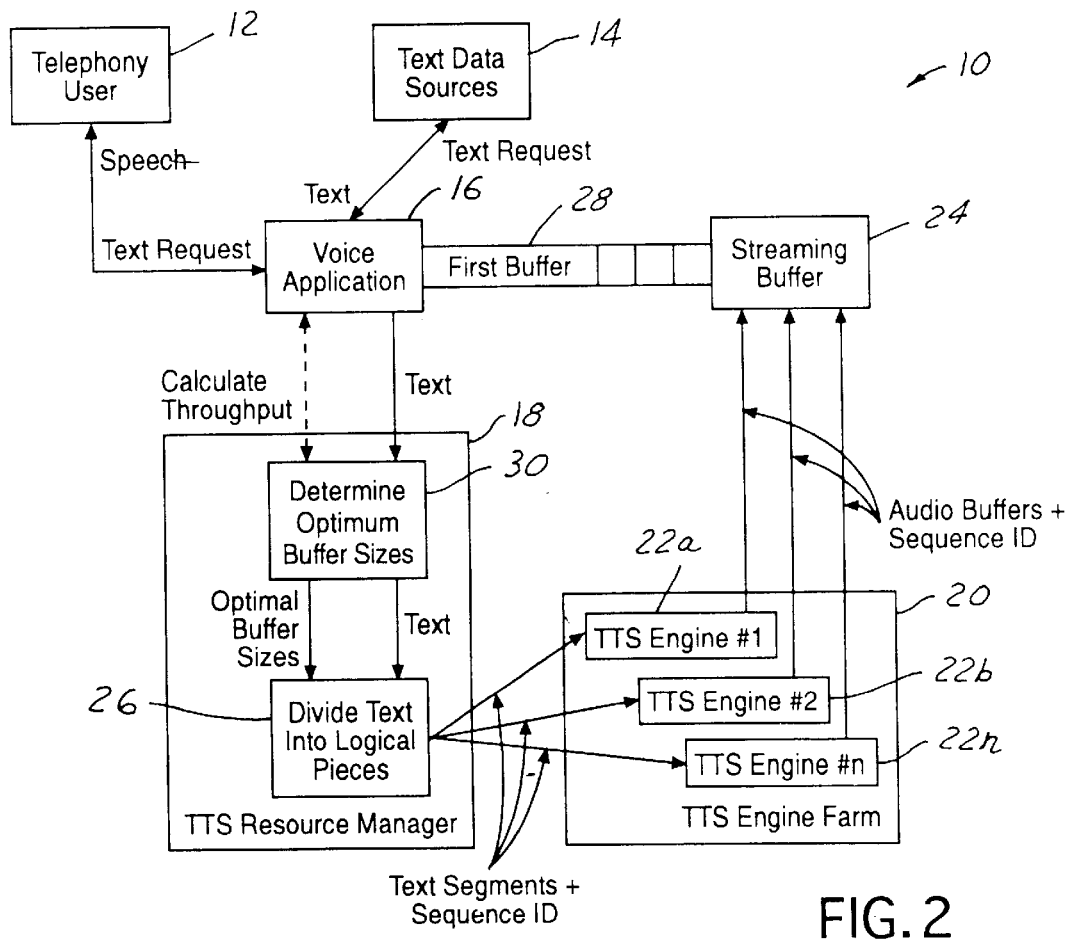
FIG. 2 illustrates in greater detail the communication system shown in FIG. 1.

Referring now to FIG. 2, a more detailed block diagram of communication system 10 is shown. TTS resource manager 18 is operable with voice application 16 to receive a text from the voice application and a telephony user address associated with telephony user 12. The telephony user address identifies the location of telephony user 12 in order to enable voice application 16 to associate the telephony user with the requested text in order to properly stream speech converted from the text to the telephony user.

TTS resource manager 18 includes a dividing processor 26 for dividing the requested text from voice application 16 into a plurality of text segments. The text segments are divided logically such as in sentences and paragraphs so that TTS engines 22 can properly convert the text segments into speech. Dividing processor 26 associates a sequence identifier with each text segment. The sequence identifiers indicate the proper order of the text segments in the text. For instance, dividing processor 26 associates a first text segment with the sequence identifier #1, a second text segment with the sequence identifier #2, and an nth text segment with the sequence identifier #n.

TTS resource manager 18 uses the sequence identifiers to line up the text segments in a message queue in the proper sequence. For example, the first text segment is lined up first in the message queue and then the second text segment is lined up next and so on. TTS resource manager 18 then provides the text segments, the corresponding sequence identifiers, and the telephony user address to TTS engine farm 20 in the sequential order.

TTS engines 22 share the responsibility for converting the text segments of a job from TTS resource manager 18 into speech (audio) segments. TTS engines 22 convert the text segments into speech segments until the entire job has been completed and the entire text has been converted into speech. In order to convert the text into speech such that speech is provided to telephony user 12 continuously and immediately, TTS resource manager 18 is operable to determine the load of each TTS engine 22 in TTS engine farm 20. TTS resource manager 18 then distributes text segments from the message queue in the sequential order to the TTS engines 22 as a function of the availability of the TTS engines. For instance, TTS resource manager 18 distributes the first text segment, the corresponding sequence identifier #1, and the telephony user address to TTS engine 22a assuming that the TTS engine 22a currently has the least load and is most available. As a result of receiving the first text segment, the load of TTS engine 22a increases and the availability of TTS engine 22a correspondingly decreases. TTS resource manager 18 then distributes the second text segment, the corresponding sequence identifier #2, and the telephony user address to TTS engine 22b assuming that TTS engine 22b currently has the least load and is most available. Similarly, TTS resource manager 18 then distributes the nth text segment, the corresponding sequence identifier #n, and the telephony user address to TTS engine 22n assuming that TTS 22n currently has the least load and is most available.

Upon a TTS engine 22 receiving a text segment the TTS engine converts or synthesizes the text segment into a speech segment. TTS engine 22 associates the corresponding sequence identifier with speech segment. For instance, TTS engine 22a converts the first text segment into a first speech segment and associates sequence identifier #1 with the first speech segment, TTS engine 22b converts the second text segment into a second speech segment and associates sequence identifier #2 with the second speech segment, and TTS engine 22n converts the nth text segment into an nth speech segment and associates sequence identifier #n with the nth speech segment.

Once a TTS engine 22 has converted a text segment into a speech segment the load of the TTS engine decreases and it becomes more available to receive another text segment from TTS resource manager 18. If the message queue of TTS resource manager 18 contains other text segments which need to be converted into speech segments then the TTS engine is a candidate to receive the current text segment in the message queue of TTS resource manager 18. For example, instead of TTS engine 22n, TTS engine 22a may receive the nth text segment after converting the first text segment into the first speech segment if nth text segment is the current text segment in the message queue of TTS resource manager 18 and TTS engine 22a is more available than all of the other TTS engines including TTS engine 22n.

After a TTS engine 22 converts a text segment into a speech segment the TTS engine provides the speech segment along with the corresponding sequence identifier and the telephony user address to a streaming buffer 24. TTS engine 22 then requests the current text segment from the message queue of TTS resource manager 18 if there are still text segments which need to be converted into speech. This process is continued until all of the text segments have been converted into speech segments and provided to streaming buffer 24 or until telephony user 12 terminates the request by hanging up the telephone or initiating another text request. Because different TTS engines 22 are simultaneously converting individual text segments into speech segments and then providing the speech segments with the corresponding sequence identifiers to streaming buffer 24 the streaming buffer may receive the speech segments in a non-sequential order. Streaming buffer 24 uses the sequence identifiers to reassemble the speech segments in the proper order. For instance, TTS engine 22b may provide the second speech segment to streaming buffer 24 before TTS engine 22a provides the first speech segment to streaming buffer 24. In this case, streaming buffer 24 uses the corresponding sequence identifiers to reassemble the first speech segment before the second speech segment in the proper sequential order.

Streaming buffer 24 and voice application 16 are connected by a network communication line 28. Streaming buffer 24 transmits the speech segments in the proper order along with the telephony user address to voice application 16 over network communication line 28. In response, voice application 16 delivers the speech segments in the proper order to telephony user 12 at the telephony user address. Telephony user 12 then listens to the speech segments which correspond to the text segments of the requested text.

It is to be understood that communication system 10 performs a form of front running in that a speech segment may be transmitted by streaming buffer 24 to voice application 16 over network communication line 28 while another text segment is being converted by a TTS engine 22 into a speech segment and/or another speech segment is being delivered to the streaming buffer by another TTS engine. For example, streaming buffer 24 may be transmitting the first speech segment to voice application 16 for delivery to telephony user 12 while TTS engine 22n is converting the nth text segment into the nth speech segment and/or TTS engine 22b is providing the second speech segment to the streaming buffer.

In order to enhance front running and ensure that the speech segments are provided to telephony user 12 continuously and naturally, communication system 10 is further operable for automatically adapting to the capacity of the bandwidth of the amount of speech segment data transmitted over network communication line 28 to telephony user 12 via voice application 16. The level of bandwidth capacity is important to be set correctly to ensure that telephony user 12 does not hear a first set of speech segments before a second set of speech segments are ready to be provided to the telephony user. For instance, it is undesirable if telephony user 12 hears the first speech segment and then hears the second speech segment after a pause. In this case, the speech would appear to telephony user 12 to be fragmented. This is an underflow error condition and may result in the speech provided to telephony user 12 to be delayed, interrupted, or completely cut off.

The underflow condition occurs when the rate at which speech segments are provided from TTS engines 22 to streaming buffer 24 is lower than the rate at which speech segments are provided by the streaming buffer to voice application 16. In essence, during an underflow condition streaming buffer 24 uses up a first set of speech segments before a second set of speech segments are provided to the streaming buffer. What is desired is that the speech segments are heard by telephony user 12 in a continuous, normal fashion without any pauses once the initial speech segments have been heard by the telephony user.

To this end, communication system 10 is operable for checking the speech segment rate into streaming buffer 24 from TTS engines 22 against the audio playing rate of the speech segments provided by the streaming buffer to voice application 16 for telephony user 12. Specifically, TTS resource manager 18 includes a buffer processor 30 for calculating the throughput of communication system 10. The throughput of communication system 10 is a measure of the time it takes to send speech segments from TTS engines 22 to streaming buffer 24. Based on the measured throughput, buffer processor 30 determines optimum buffer sizes for the speech segments to be provided by TTS engines 22 to streaming buffer 24. The optimum buffer size is indicative of the proper amount of speech segment data to be transmitted by a TTS engine 22 to streaming buffer 24 in order to avoid underflow and overflow conditions. In this way, communication system 10 provides adaptive streaming in that the amount of speech segment data provided to streaming buffer 24 by TTS engines 22 changes as a function of the throughput of the communication system.

Upon determining the optimum buffer size, buffer processor 30 transmits this information to dividing processor 26 of TTS resource manager 18. Dividing processor 26 uses the optimum buffer size information when dividing the text into text segments such that the amount of the corresponding converted speech segment data is roughly equal to the optimum buffer size. As explained above, TTS engines 22 then convert the text segments into speech segments, i.e., audio buffers, and transmit the audio buffers along with the corresponding sequence identifiers to streaming buffer 24. Streaming buffer 24 then uses the sequence identifiers to reassemble the audio buffers in the proper order and then provides the audio buffers in the proper order to voice application 16 for delivery to telephony user 12.

In essence, based on the measured throughput, buffer processor 30 determines how much speech segment data needs to be provided to streaming buffer 24 before the streaming buffer can provide the speech segments to voice application 16 without provoking an underflow condition. Buffer processor 30 uses the measured throughput to determine how many and how frequently speech segments need to be provided by TTS engines 20 to streaming buffer 24 in order for the streaming buffer to provide continuous audio to telephony user 12 via voice application 16 once telephony user 12 hears the initial speech segments. In the case of a potential underflow error condition, buffer processor 30 increases the buffer size to avoid the underflow error condition such that more speech segment data is provided to streaming buffer 24 from TTS engines 22.

Thus it is apparent that there has been provided, in accordance with the present invention, a method and system for delivering TTS in a real time telephony environment in which text documents of any size are efficiently converted into speech and the speech is provided immediately to a telephony user that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A communication system for communicating information to a telephony user in response to a request for the information from the telephony user, the system comprising:

a text data source having a plurality of text documents;

a voice application operable with the telephony user for receiving a request from the telephony user for information, wherein the voice application is operable with the text data source for retrieving a text document related to the information requested by the telephony user;

a text-to-speech (TTS) resource manager operable for dividing the text document into text document segments and associating a sequence number with each text document segment, wherein the TTS resource manager places the text document segments and the corresponding sequence numbers in a sequential order within a queue;

a TTS engine farm having a plurality of TTS engines operable for receiving text document segments and the corresponding sequence numbers from the queue of the TTS resource manager in the sequential order for converting the text document segments into speech segments, wherein each text document segment is converted into a speech segment by one TTS engine; and a buffer for receiving the speech segments and the corresponding sequence numbers from the TTS engines, wherein the buffer uses the corresponding sequence numbers to reassemble the speech segments in the proper order and then delivers the speech segments in the proper order to the telephony user via the voice application in order to satisfy the request for information from the telephony user, wherein the buffer delivers a first speech segment to the telephony user via the voice application after the buffer has received a second speech segment from a TTS engine and while the buffer is receiving a third speech segment from a TTS engine such that the speech segments are delivered to the telephony user continuously.

2. The system of claim 1 wherein:
the TTS resource manager is operable to determine the rate at which speech segments are delivered to the telephony user from the buffer, wherein the TTS resource manager divides the text document as a function of the rate at which speech segments are delivered to the telephony user such that the speech segments are delivered from the TTS engines to the buffer and from the buffer to the telephony user continuously.

3. The system of claim 1 wherein:
the TTS resource manager is operable to determine the load of each of the TTS engines, wherein the TTS resource manager delivers the text document segments to the TTS engines as a function of the load of the TTS engines.

4. The system of claim 1 wherein:
the buffer delivers the first speech segment to the telephony user via the voice application while a TTS engine is converting a fourth text document segment into a fourth speech segment.

5. The system of claim 1 wherein:
the text data source is located on the Internet.

6. The system of claim 1 wherein:
the text data source is an email provider and the text document is an email document.

7. The system of claim 1 wherein:
the text data source is a content provider.

8. The system of claim 7 wherein:
the content provider is a sports content provider and the text document is a sports document.

9. The system of claim 7 wherein:
the content provider is a weather content provider and the text document is a weather document.

10. The system of claim 7 wherein:
the content provider is a stock quote provider and the text document is a stock quote document.

11. The system of claim 7 wherein:
the content provider is a news content provider and the text document is a news document.

12. The system of claim 1 wherein:
the request from the telephony user is an audio request, wherein the voice application is operable for converting the audio request into a text request in order to retrieve a text document related to the information requested by the telephony user.

13. The system of claim 1 wherein:
the request from the telephony user is a dual tone multi-frequency request, wherein the voice application is operable for converting the dual tone multi-frequency request into a text request in order to retrieve a text document related to the information requested by the telephony user.

14. A communication system for communicating information to a telephony user in response to a request for the information from the telephony user, the system comprising:
a text data source having a plurality of text documents;
a voice application operable with the telephony user for receiving a request from the telephony user for information, wherein the voice application is operable with the text data source for retrieving a text document related to the information requested by the telephony user;
a text-to-speech (TTS) resource manager operable for dividing the text document into text document segments and associating a sequence number with each text document segment, wherein the TTS resource manager places the text document segments and the corresponding sequence numbers in a sequential order within a queue;
a TTS engine farm having a plurality of TTS engines operable for receiving respective text document segments and the corresponding sequence numbers from the queue of the TTS resource manager in the sequential order for converting the text document segments into speech segments, wherein a first TTS engine receives a first text document segment and the corresponding sequence number from the queue of the TTS resource manager for converting the first document segment into a first speech segment and then a second TTS engine receives a second text document segment and the corresponding sequence number from the queue of the TTS resource manager for converting the second text document segment into a second speech segment; and
a buffer for receiving the first and second speech segments and the corresponding sequence numbers from the first and second TTS engines, wherein the buffer uses the corresponding sequence numbers to reassemble the first and second speech segments in the proper order and then delivers the speech segments in the proper order to the telephony user via the voice application in order to satisfy the request for information from the telephony user;
wherein the first TTS engine receives a third text document segment and the corresponding sequence number from the queue of the TTS resource manager for converting the third text document segment into a third speech segment after the first TTS engine has converted the first text document segment into the first speech segment, wherein the buffer receives the third speech segment from the first TTS engine and uses the corresponding sequence numbers to reassemble the first, second, and third speech segments in the proper order such that the third speech segment is delivered to the telephony user after the first and second speech segments have been delivered to the telephony user.

15. The system of claim 14 wherein:
the TTS resource manager is operable to determine the rate at which speech segments are delivered to the telephony user from the buffer, wherein the TTS resource manager divides the text document as a function of the rate at which speech segments are delivered to the telephony user such that the speech segments are delivered to the telephony user continuously.

16. The system of claim 14 wherein:
the TTS resource manager is operable to determine the load of each of the TTS engines, wherein the TTS resource manager delivers the text document segments to the TTS engines as a function of the load of the TTS engines.

17. A communication system for communicating information to a telephony user in response to a request for the information from the telephony user, the system comprising:
a text data source having a plurality of text documents;
a voice application operable with the telephony user for receiving a request from the telephony user for information, wherein the voice application is operable with the text data source for retrieving a text document related to the information requested by the telephony user;
a text-to-speech (TTS) resource manager operable for dividing the text document into text document segments and associating a sequence number with each text document segment, wherein the TTS resource manager places the text document segments and the corresponding sequence numbers in a sequential order within a queue;
a TTS engine farm having a plurality of TTS engines operable for receiving respective text document segments and the corresponding sequence numbers from the queue of the TTS resource manager in the sequential order for convening the text document segments into speech segments, wherein a first TTS engine receives a first text document segment and the corresponding sequence number from the queue of the TTS resource manager for converting the first document segment into a first speech segment and then a second TTS engine receives a second text document segment and the corresponding sequence number from the queue of the TTS resource manager for converting the second text document segment into a second speech segment; and
a buffer for receiving the first and second speech segments and the corresponding sequence numbers from the first and second TTS engines, wherein the buffer uses the corresponding sequence numbers to reassemble the first and second speech segments in the proper order and then delivers the speech segments in the proper order to the telephony user via the voice application in order to satisfy the request for information from the telephony user, wherein the buffer delivers the first and second speech segments to the telephony user via the voice application while the buffer is receiving a third speech segment and the corresponding sequence number from a TTS engine.

18. The system of claim 17 wherein:
the buffer delivers the first and second speech segments to the telephony user via the voice application while a TTS engine is converting a fourth text document segment into a fourth speech segment.

* * * * *